Sept. 13, 1927.

O. HOMMEL

GLASS DECORATING

Filed Sept. 1, 1921

1,642,441

WITNESSES:

INVENTOR
Oscar Hommel
BY
ATTORNEY

Patented Sept. 13, 1927.

1,642,441

UNITED STATES PATENT OFFICE.

OSCAR HOMMEL, OF PITTSBURGH, PENNSYLVANIA.

GLASS DECORATING.

Application filed September 1, 1921. Serial No. 497,499.

My invention relates to the art of decorating glass and particularly to a process of casing glass.

One object of my invention is to provide a process of forming a stable evenly distributed coating of glass on glass.

Another object of my invention is to form a stable coating of colored glass on a glass object by fusing granular glass thereon.

Another object of my invention is to provide a process of the above indicated character, that shall utilize the intense heat of the glass object to uniformly fuse the granular glass.

Another object of my invention is to provide a process of coloring glass that is permanent, applicable to casing and that will not soften or scratch off.

A further object of my invention is to provide a process of the above indicated character, that shall be simple, inexpensive and reliable.

In the carrying out of my invention I sprinkle, sift or otherwise deposit a quantity of granulated stable colored glass on the glass object to be colored either before or as it is taken from the mould. The intense heat of the glass object will melt the granulated glass and this will form a casing of the desired color which will be integral with the glass object and homogeneous. I have found that it is necessary to have the glass in a granulated form to permit sifting and even distribution.

Figure 1:
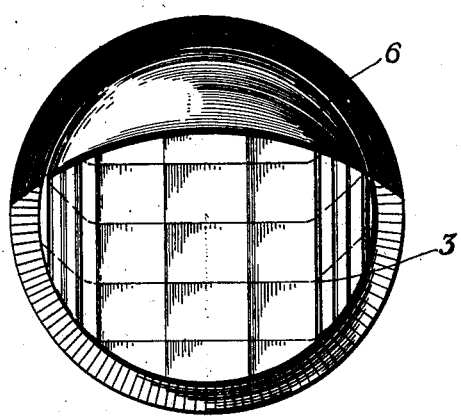
Figure 2:
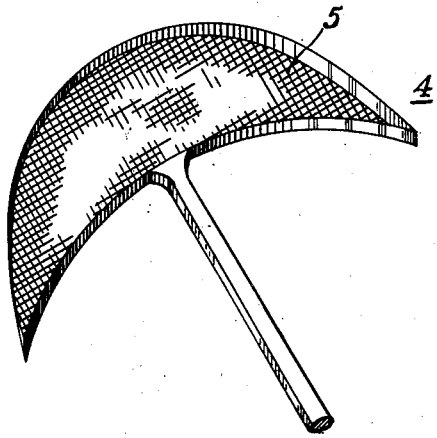

Figure 1 of the accompanying drawings is a view of a glass object with a colored casing made in accordance with my invention; and Fig. 2 is a perspective view of a receptacle for sprinkling the granulated glass on the object to be coated.

Heretofore it has been usual to apply a coloring material to glass and to refire the same. Such a glass object when refired may warp and the color may be easily scratched off. Besides, the process is very expensive because of the slowness of application caused by the rehandling and the refiring process and its attendant breakages. It has also, heretofore, been suggested that powdered or pulverized glass be applied to a glass object for the purpose of decorating the same by utilizing the heat of the object without the necessity of refiring. I have found that the powdered or pulverized glass is difficult to apply and builds up on certain portions of the object and can not be applied with an air spray because of this property. In view of the above, I reduce my colored glass to a granular form so that it can be readily sifted on and evenly distributed over the surface to be decorated. The granular form also permits of being applied by an air blast. My invention, by reason of the granular form of the glass, is particularly applicable to decorating entire surfaces whereas the heretofore proposed methods were only applicable for decorating small portions of glass ware.

If it is desired to color a portion of a glass object such as the hood of a head light lens 3, shown in Fig. 1, to render that portion opaque or to diffuse the light through that portion, I sift a quantity of granular glass from a receptacle 4 having a wire mesh bottom 5 onto that portion of the lens 3 desired to be colored. Since the granulated glass is sifted immediately after the lens 3 is removed from the mould and by reason of its granular form is evenly distributed thereover the intense heat melts the granulated glass and it forms a stable glass sheet or casing over the portion 6 of the lens.

The casing formed over the portion 6 of the lens is stable and cannot be scratched off nor will it peal when heated. The essential feature, however, is that the glass be in granular form and be made of such glass forming materials that it will be stable.

I have found that a granular form of glass made of silica, lead oxide, feldspar, boric acid and such coloring materials as cobalt, manganese and ferric oxides is suitable for this purpose as it forms a stable glass. However, silica with borax and lead or soda and lime may be used if desired with some form of coloring matter as copper oxide or cobalt. The stable glass must, of course, have a sufficiently low melting point to permit its fusion from the heat of the glass object without refiring, but further than that I do not limit my invention to any particular form of granulated glass.

It is only essential to sprinkle the granulated glass on the heated glass to be colored as it comes from the mould to obtain the best results. A stencil may be used if desired and the granulated glass blown on with an air blast or dusted on with a hand brush.

If a receptacle 4 is used it is well to have the same shaped as in the illustration to correspond to the portion 6 of the article 3 to be treated.

My invention is not limited to the decoration of a head light lens as illustrated nor to the particular method of applying the granulated glass, as obvious modifications in the method of applying will be seen and its uses will be numerous. I therefore do not desire to be limited to the method described as many changes may be made without departing from the spirit or scope of my invention as set forth in the appended claims.

I claim as my invention:

1. The process of decorating glass consisting in fusing to the glass by the heat stored during the manufacture thereof a granular powder made of a stable glass.

2. The process of coloring a portion of a glass article consisting in fusing to that portion of the article immediately after the article is removed from its mould a colored glass granular powder made of a stable glass.

3. The process of coloring a portion of a glass article consisting in sifting and fusing granulated stable glass on that portion of the article immediately after the article is removed from its mould.

4. The process of coloring a glass article consisting in distributing and fusing granulated colored glass on the article immediately after it is removed from its mould.

5. The process of coloring a glass article consisting in distributing granulated colored silica glass on the article and causing it to be fused by the heat stored in the article.

6. The process of coloring a glass article consisting in distributing granulated colored silica glass on the article and causing it to be fused by the heat stored in the article during its manufacture.

7. The process of casing a glass article consisting in sprinkling granulated stable glass thereon and permitting the same to fuse by the heat stored in the article during the manufacture thereof.

8. The process of casing a glass article consisting in depositing granulated glass thereon while the article is at such heat as to melt the granulated glass.

9. The process of decorating a glass article consisting in depositing and fusing a granular mixture of silica, boric acid, lead and a colored oxide thereon immediately after the article has been removed from its mould.

10. The process of decorating a glass article consisting in depositing a granular mixture thereon made of such proportions of silica, boric acid, lead and feldspar that when it comes into contact with the article after it is removed from its mould, it fuses by the heat remaining in the article to form an evenly distributed stable glass coating.

11. The process of decorating an article consisting in depositing a granular glass mixture thereon and permitting the same to melt by reason of the heat of the article stored during manufacture thereof.

In testimony whereof, I have hereunto subscribed my name this 20 day of August, 1921.

OSCAR HOMMEL.